US012762866B2

(12) United States Patent
Lilja et al.

(10) Patent No.: US 12,762,866 B2
(45) Date of Patent: Oct. 13, 2026

(54) ROAD GEOMETRY ESTIMATION FOR VEHICLES

(71) Applicant: ZENSEACT AB, Gothenburg (SE)

(72) Inventors: Adam Lilja, Gothenburg (SE); Junsheng Fu, Nödinge (SE); Lars Hammarstrand, Mölnlycke (SE)

(73) Assignee: ZENSEACT AB, Gothenburg (SE)

( * ) Notice: Subject to any disclaimer, the term of this patent is extended or adjusted under 35 U.S.C. 154(b) by 211 days.

(21) Appl. No.: 18/816,542

(22) Filed: Aug. 27, 2024

(65) Prior Publication Data

US 2025/0078519 A1 Mar. 6, 2025

(30) Foreign Application Priority Data

Aug. 29, 2023 (EP) .................................... 23194072

(51) Int. Cl.

| | |
|---|---|
| ***G06K 9/00*** | (2022.01) |
| ***G06V 10/77*** | (2022.01) |
| ***G06V 10/82*** | (2022.01) |
| ***G06V 20/56*** | (2022.01) |

(52) U.S. Cl.

CPC .......... *G06V 20/56* (2022.01); *G06V 10/7715* (2022.01); *G06V 10/82* (2022.01)

(58) Field of Classification Search

CPC ............. G06V 2201/08; G06V 10/776; G06V 10/774; G06V 10/143; G06V 10/82; G06V 20/46; G06V 10/7715; G06V 20/58; G06V 20/588; G06V 20/56

See application file for complete search history.

(56) References Cited

U.S. PATENT DOCUMENTS

| | | | | |
|---|---|---|---|---|
| 2025/0021712 | A1 * | 1/2025 | Gopalan | G06F 16/332 |
| 2025/0291033 | A1 * | 9/2025 | Ruppel | G01S 7/4802 |

OTHER PUBLICATIONS

Qin, Zequn, et al. "Unifusion: Unified multi-view fusion transformer for spatial-temporal representation in bird's-eye-view." Proceedings of the IEEE/CVF international conference on computer vision. 2023. (Year: 2023).*

(Continued)

*Primary Examiner* — Avinash Yentrapati

(74) *Attorney, Agent, or Firm* — Sage Patent Group

(57) ABSTRACT

The invention relates to a method for determining a representation of one or more road objects of a road for a vehicle traveling on the road. The method includes, for each time step out of a plurality of consecutive time steps, encoding images output from the one or more cameras of a vehicle using machine-learning algorithms trained to output image features of road objects depicted in an image provided as input to the machine-learning algorithms. The method further includes transforming a plurality of image features included in the encoded images to a Bird's Eye View (BEV) representation of the plurality of image features. The method also includes decoding the BEV representation to extract a set of object embeddings using transformer-based machine-learning algorithms. Further, the method includes outputting a position and class of each road object of the one or more road objects by decoding the extracted set of object embeddings.

13 Claims, 3 Drawing Sheets

(56) References Cited

OTHER PUBLICATIONS

Qin, Zequn et al.; "UniFusion: Unified Multi-view Fusion Transformer for Spatial-Temporal Representation in Bird's-Eye-View"; https://arxiv.org/pdf/2207.08536.pdf; XP093120286; Mar. 20, 2023, 13 pages.

Zhang, Zhihuang et al.; "BEV-Locator: An End-to-end Visual Semantic Localization Network Using Multi-View Images"; Journal of Latex Class Files, vol. 14, No. 8, Aug. 2021; https://arxiv.org/pdf/2211.14927.pdf; XP091379806; 12 pages.

Zhao, Yun et al.; "Scene Representation in Bird's-Eye View from Surrounding Cameras with Transformers"; 2022 IEEE/CVF Conference on Computer Vision and Pattern Recognition Workshops (CVPRW); Jun. 19, 2022; XP034174219; pp. 4511-4519 (9 pages).

Ma, Yuexin et al.; "Vision-Centric BEV Perception: A Survey"; https://arxiv.org/pdf/2208.02797; XP091529774; Jun. 7, 2023; 19 pages.

Extended European Search Report mailed Jan. 30, 2024 for European Application No. 23194072.7, 9 pages.

Vaswani, Ashish et al.; "Attention Is All You Need"; 31st Conference on Neural Information Processing Systems (NIPS 2017); https://arxiv.org/pdf/1706.03762; Jun. 12, 2017; 15 pages.

* cited by examiner

ROAD GEOMETRY ESTIMATION FOR VEHICLES

CROSS-REFERENCE TO RELATED APPLICATIONS

The present application for patent claims priority to European Patent Office Application Ser. No. 23194072.7, entitled "ROAD GEOMETRY ESTIMATION FOR VEHICLES" filed on Aug. 29, 2023, assigned to the assignee hereof, and expressly incorporated herein by reference.

TECHNICAL FIELD

The disclosed technology relates to methods and systems for determining a representation of one or more road objects of a road for a vehicle traveling on the road. In particular, but not exclusively the disclosed technology relates to real-time estimation of the road geometry where the road geometry is based on a tracking of multiple road objects (e.g., lane markers, road edges, road barriers, etc.)

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS, which for instance may be represented by adaptive cruise control (ACC) collision avoidance system, forward collision warning, etc., are electronic systems that may aid a vehicle driver while driving. Today, there is ongoing research and development within a number of technical areas associated to both the ADAS and the Autonomous Driving (AD) field. AD and ADAS may also be referred to as Automated Drive Systems (ADS) with different levels, where AD is commonly classified as ADS of level 3 or higher as defined by SAE J3016, while ADAS is commonly classified as ADS of level 2 or lower as defined by SAE J3016.

As computer hardware in vehicles continue to progress, it allows for an increasing amount of effort to be put into the development of Automated Driving Systems, and many active safety systems such as ACCs and Lane Support Systems (LSSs) are reliant on having some knowledge of the road surrounding the vehicle. Thus, increasing the accuracy and redundancy in road estimation systems may therefore be crucial for improving driver safety and comfort.

Thus, for all lane support systems or any other steering system, precise and reliable detection of the road geometry is a key function. In particular, such systems rely upon precise and reliable tracking of road objects such as lane marker tracking or road edge tracking. In general, the lane marker tracking features detect and classify lane markers from images captured by one or more cameras mounted on the vehicle. Then, based upon this detection, a mathematical representation of the geometrical shape or position of the lane markers or road edge(s) is computed and a road model (including a lane geometry) of the travelled upon road segment can be determined.

SUMMARY

The herein disclosed technology seeks to mitigate, alleviate or eliminate deficiencies and disadvantages in the prior art to address various problems relating to inadequate accuracy in road geometry tracking solutions and/or computationally expensive and memory intensive road geometry tracking solutions.

Various aspects and embodiments of the disclosed invention are defined below and in the accompanying independent and dependent claims.

A first aspect of the disclosed technology comprises a computer-implemented method for determining a representation of one or more road objects of a road for a vehicle traveling on the road, where the vehicle has one or more cameras. The method comprises, for each time step out of a plurality of consecutive time steps, encoding one or more images output from the one or more cameras using one or more machine-learning algorithms trained to output image features of one or more road objects depicted in an image provided as input to the one or more machine-learning algorithms. The method further comprises (for each time step) transforming a plurality of image features comprised in the one or more encoded images to a Bird's Eye View (BEV) representation of the plurality of image features. Moreover, the method comprises (for each time step) decoding the BEV representation in order to extract a set of object embeddings from the BEV representation using one or more transformer-based machine-learning algorithms trained to output the set of object embeddings based on an input comprising the BEV representation, a set of object queries, and a set of transformed prior object embeddings extracted at a preceding time step. Further, the method comprises (for each time step) outputting a position and class of each road object of the one or more road objects by decoding the extracted set of object embeddings.

A second aspect of the disclosed technology comprises a computer program product comprising instructions which, when the program is executed by a computing device of a vehicle, causes the computing device to carry out the method according to any one of the embodiments disclosed herein. With this aspect of the disclosed technology, similar advantages and preferred features are present as in the other aspects.

A third aspect of the disclosed technology comprises a (non-transitory) computer-readable storage medium comprising instructions which, when executed by a computing device of a vehicle, causes the computing device to carry out the method according to any one of the embodiments disclosed herein. With this aspect of the disclosed technology, similar advantages and preferred features are present as in the other aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

A fourth aspect of the disclosed technology comprises a system for determining a representation of one or more road objects of a road for a vehicle traveling on the road, where the vehicle has one or more cameras. The system comprises one or more memory storage areas comprising program code, the one or more memory storage areas and the program code being configured to, with the one or more processors, cause the system to at least, for each time step out of a plurality of consecutive time steps, encode one or more images output from the one or more cameras using one or more machine-learning algorithm trained to output image features of one or more road objects depicted in an image provided as input to the one or more machine-learning algorithms. Further, the system is caused to transform a plurality of image features comprised in the one or more encoded images to a Bird's Eye View (BEV) representation of the plurality of image features, and decode the BEV representation in order to extract a set of object embeddings from the BEV representation using one or more transformer-based machine-learning algorithms trained to output the set of object embeddings based on an input comprising the BEV representation, a set of object queries, and a set of transformed prior object embeddings extracted at a preceding time step. Moreover, the system is caused to output a position and class of each road object of the one or more road objects by decoding the extracted set of object embeddings. With this aspect of the disclosed technology, similar advantages and preferred features are present as in the other aspects.

A fifth aspect of the disclosed technology comprises a vehicle comprising a system according to any one of the embodiments of the fourth aspect disclosed herein. With this aspect of the disclosed technology, similar advantages and preferred features are present as in the other aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

An advantage of some embodiments is that there is provided a computationally efficient solution for estimating road geometries for vehicles, and in particular ADS-equipped vehicles.

An advantage of some embodiments is that accuracy of the road geometry estimation is improved without drastic increases in computational power and data storage needs.

An advantage of some embodiments fusing of the output from sensors of different modalities in order to generate a road geometry estimation is facilitated.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
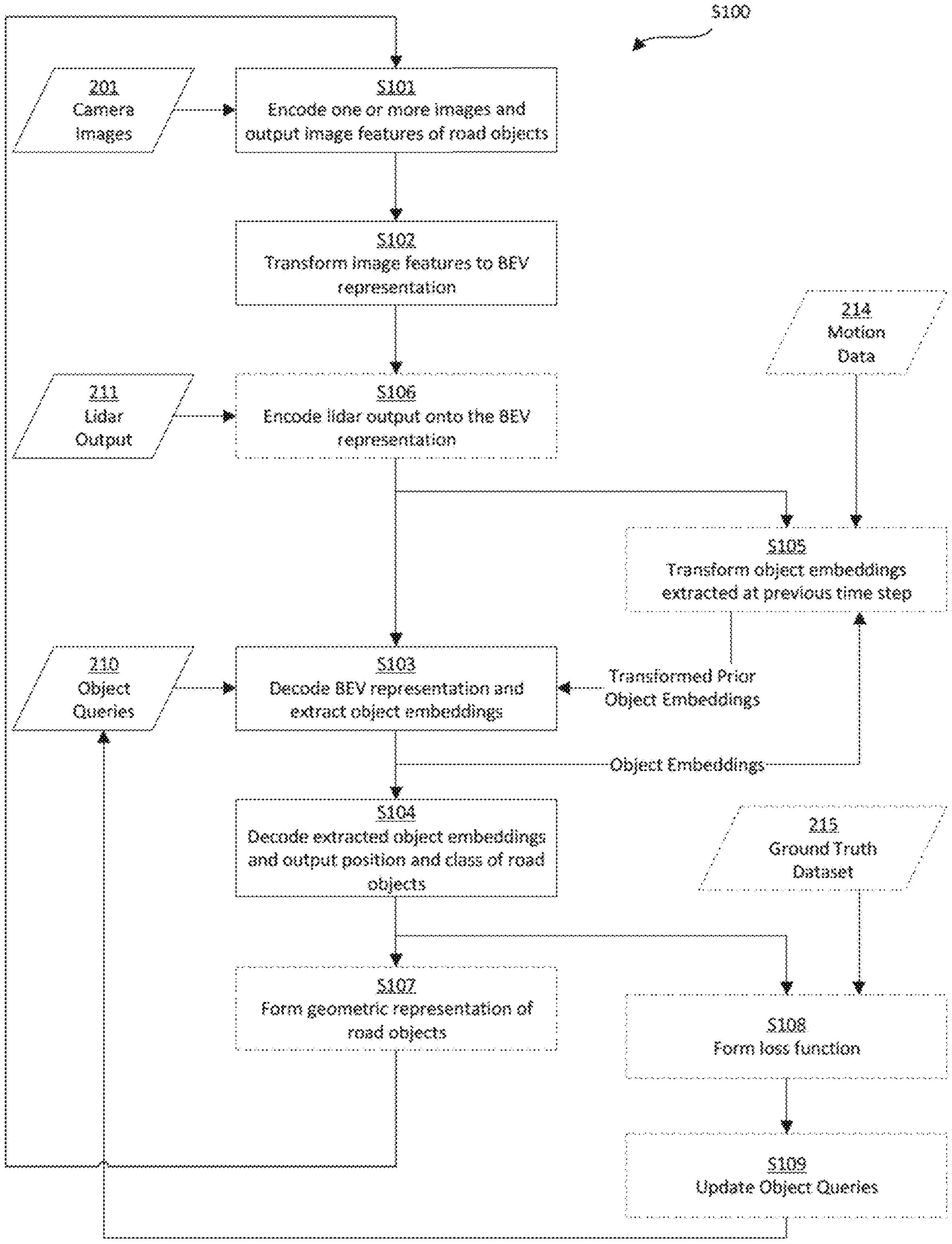
FIG. 1 is a schematic flowchart representation of a method for determining a representation of one or more road objects of a road for a vehicle traveling on the road in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

In general, autonomous vehicles (also referred to as ADS-equipped vehicles herein) rely on a variety of sensors, including cameras, radars and lidars to perceive their surroundings and make decisions about how to navigate the environment and manoeuvre the vehicle. Understanding the road geometry may be considered to be an important aspect of this perception process, as it provides critical information about the layout of the road upon which the vehicle is traveling. In short, some embodiments herein provide a means to estimate the road geometry in real-time, where the road geometry is formed on the basis of tracked road objects. These road objects may for example be lane markers, road edges, pedestrian crossings, and so forth. Each detected road object is in turn comprised by multiple points spanning the shape of the road object's geometry, and on the basis of the road objects' geometries the road geometry (i.e., the geometry of the lanes and road edges) can be derived.

One popular approach for estimating the road geometry involves a process of detecting and segmenting road objects in the image plane (i.e., in the "camera view") and the projecting them to 3D (i.e., to a Bird's Eye View (BEV) or Top-View representation) using mono-depth estimation or geometric projection. Lastly, some Bayesian filter architecture is employed to track the resulting road objects. Then, an estimate of the road geometry is made on the basis of these tracked road objects. This means that such tracking processes discard a large amount of the available information about the road as it only the resulting geometrical representations of the detected road objects that are tracked.

However, since the road is static while the vehicle is moving it may be advantageous to accumulate more information over time (more than just the tracked road objects) in order to improve accuracy of the road model estimation. Thus, while many of the currently used road geometry estimation methods track "lightweight" objects (such as the detected lane markers) using statistical models like Bayesian filters (e.g., Kalman filters)—there have been some attempts to track a high-dimensional representation of the entire scene over time to accumulate information and make more accurate predictions. However, tracking the entire scene has proven to be computationally expensive and memory-intensive making it less suitable for online implementations (i.e., for real-time tracking in the vehicle).

In summary, it can be said that there two main approaches for tracking a road geometry. Namely, to track the "lightweight" detected objects or to track the "heavy" entire scene representation.

In accordance with some embodiments herein, it is proposed to instead track a high-level feature representation of road objects, namely the object embeddings, rather than the geometric representation of the detected road objects or the entire Bird's Eye View (BEV) representation of the entire scene. In other words, some embodiments herein propose an approach that aims to include more information than the "output objects" in the tracking process while avoiding the need to store the entire scene representation between timesteps. Accordingly, by striking a balance between computational efficiency and road geometry estimation accuracy, an advantage of some embodiments is that the perception of road geometry can be enhanced or otherwise improved for Automated Driving Systems for vehicles.

The term "image features" may be understood as distinct and informative characteristics or patterns extracted from camera images. These features are typically generated by algorithms designed to process visual data, such as Convolutional Neural Networks (CNNs) or other computer vision techniques. Image features enable machines to understand and interpret visual information from the environment. In more detail, image features may represent specific patterns or structures within an image that are relevant to the task at hand. These patterns can include edges, corners, textures, shapes, or more complex visual elements like objects or object parts. Image features are typically represented as numerical vectors, where each element of the vector corresponds to a specific aspect of the visual information. These vectors may then be used as input to other algorithms for various tasks, such as object detection, transformation, classification, or segmentation.

In the present context, a "road object" refers to a specific element or feature on or related to the road surface that is detected, recognized, and tracked by the vehicle's perception system, and in particular, the vehicle's road geometry estimation system. These road objects provide information about the road environment and enable for safe and efficient autonomous driving. Examples of road objects include lane markings, road edges, curbs, road intersections, pedestrian crossings, road geometry features (e.g., curvature, slope, and elevation changes).

The term "machine-learning algorithm" may be understood as a set of computational rules and procedures designed to enable a computer program or system to automatically learn patterns, relationships, and insights from data without being explicitly programmed. These algorithms form the foundation of machine learning, a subfield of artificial intelligence (AI). Moreover, machine-learning (ML) algorithms are data-driven. They operate by analysing and learning from a dataset, which contains examples or instances with associated features or attributes. These algorithms aim to discover patterns or correlations within the data that can be used for various tasks. ML algorithms typically undergo a training process, during which they are exposed to a labelled dataset (supervised learning) or an unlabelled dataset (unsupervised learning). During training, the algorithm adjusts its internal parameters to capture the underlying patterns in the data. Further, one of the primary objectives of a machine-learning algorithm is to generalize its learning from the training data to make predictions or decisions on new, unseen data. The algorithm should be able to make accurate and reliable predictions beyond the training set. The machine-learning algorithms (may also be referred to as machine-learning models, neural networks, and so forth) are implemented in some embodiments using publicly available suitable software development machine learning code elements, for example, such as those which are available in Python, Keras and TensorFlow or in any other suitable software development platform, in any manner known to be suitable to someone of ordinary skill in the art.

In the present context, a "Bird's Eye View" representation, often referred to as a "top-down view" or "overhead view," is a graphical representation of the vehicle's surroundings or the road scene from a perspective directly above the vehicle. This representation is typically generated using data from various sensors such as cameras, LiDAR, radar, and/or GPS, and it offers a comprehensive and holistic view of the environment around the vehicle. The BEV provides a top-down perspective of the road and its objects, often represented as a grid, with each cell encoding information about the presence and characteristics of road objects.

A "transformer-based machine-learning algorithm" (or just "transformer") is a type of deep learning model designed primarily for handling sequential data, such as natural language, time-series data, and more. Transformers have gained significant popularity and success in various applications, particularly in the fields of natural language processing (NLP) and computer vision. They were introduced in the paper "Attention Is All You Need" by Vaswani et al. in 2017 and have since become a cornerstone of modern deep learning. Moreover, transformers generally consist of multiple layers, each comprising self-attention and feedforward sub-layers. Stacking these layers allows the model to learn increasingly abstract representations of the input data. Transformers may also be used as encoders, decoders, or both.

In more detail, one key-aspect of transformers is the attention mechanism, which allows the model to focus on different parts of the input sequence when processing it. This mechanism enables the model to capture long-range dependencies in the data, which was a challenge for earlier recurrent neural networks (RNNs) and convolutional neural networks (CNNs). Transformers use a self-attention mechanism, where each element (or token) in the input sequence attends to all other elements in a weighted manner. This allows the model to weigh the importance of different elements dynamically based on their context within the sequence.

In general, the term "object embeddings" may be understood as a technique used to represent and encode information about objects in a scene, such as vehicles, pedestrians, and obstacles, in a structured and meaningful way. In the context of the present disclosure, the "object embeddings" accordingly comprise machine-readable information about the detected road objects (e.g., lane markers, road edges, pedestrian crossings, etc.). These embeddings are typically numerical vectors that capture various attributes and characteristics of the objects, allowing computers (i.e., the ADSs) to understand and reason about their surroundings.

In some examples, object embeddings encode high-dimensional features that describe an object's appearance, motion, and other relevant attributes. These features can include information about an object's position, velocity, size, shape, colour, texture, and more. In some examples, object embeddings may also capture semantic information about the object, such as its class (e.g., car, bicycle, pedestrian) and its unique identifier. This semantic understanding may be important for object recognition and tracking. In some examples, object embeddings may include temporal information, such as an object's trajectory or its recent history, to predict its future behaviour. In some examples, object embeddings can represent the spatial relationships between objects in a scene. For example, they can capture whether an object is in front of or behind another object, its relative distance, and orientation with respect to other objects. Moreover, object embeddings may also incorporate uncertainty estimates, indicating the system's confidence in its object detection and tracking. This is essential for safe decision-making in autonomous driving.

Thus, object embeddings are fundamental for a wide range of tasks in autonomous driving, such as object detection, object tracking, motion prediction, and path planning. They provide a compact and informative representation of the surrounding environment, enabling autonomous vehicles to make informed decisions and navigate safely in complex and dynamic traffic scenarios. Advanced machine learning techniques, such as deep neural networks, are often used to learn and generate these embeddings from sensor data like LiDAR, radar, and cameras.

The term "object queries" may be understood as a mechanism or concept that enables the retrieval or interaction with specific object representations or embeddings within a larger set or database of such embeddings. This concept is often associated with approaches that use attention mechanisms or similar techniques to focus on and retrieve relevant embeddings based on specific criteria or queries. Thus, object queries may be understood as requests or queries made to this database (e.g., the BEV representation of the plurality of image features) to retrieve specific object embeddings that match certain criteria or properties. These queries can be based on a variety of factors, such as object category, similarity to a reference object, spatial proximity, or any other relevant attribute. In other words, object queries may be construed as "initial guesses" of the object embeddings, and may therefore have a 1:1 ratio with the object embeddings (i.e., same number of object embeddings as object queries, and same-sized vectors).

Object queries often involve the use of attention mechanisms, which are a fundamental component of many modern machine learning models, including transformers. Attention mechanisms allow the model to focus on specific parts of the input data or embeddings while downplaying others, effectively acting as a mechanism for querying the data. In computer vision applications, object queries can be used to retrieve and track specific objects within a video stream or image.

FIG. 1 is a schematic flowchart representation of a S100 method for determining a (geometric) representation of one or more road objects of a road for a vehicle traveling on the road in accordance with some embodiments. A geometric representation may in some embodiments be construed as a 3D representation. The method S100 is preferably a computer-implemented method S100, performed by a processing system of the ADS-equipped vehicle. The processing system may for example comprise one or more processors and one or more memories coupled to the one or more processors, wherein the one or more memories store one or more programs that causes the processing system to perform the steps, services and functions of the method S100 disclosed herein when executed by the one or more processors.

The method S100 is a repetitive method S100, meaning that it repeats the method steps with some set frequency or sample rate. In other words, the method S100 is executed at each time step or time period out of a plurality of consecutive time steps or time periods. For example, the method may be executed once every 50 ms, meaning at a sample rate of 20 Hz.

The method S100 comprises encoding S101 one or more images 201 output from the one or more cameras using one or more machine-learning algorithms. The one or more machine-learning algorithms are trained to output image features of one or more road objects depicted in an image 201 provided as input to the one or more machine-learning algorithms. An "encoded image" typically refers to an image that has been transformed or represented in a different format or space, often using encoding techniques (in the present case, using one or more trained machine-learning algorithms). These encoding methods are used to extract and represent specific features or information from the original image, making it more suitable for further processing, analysis, or transmission. Thus, in the present context, the road objects depicted in the input image 201 are extracted and represented as "image features" in order to make it more suitable for further processing by a computer or machine.

For example, features are parts or patterns of an object in an image that help to identify it. For example, a square has 4 corners and 4 edges, they can be called features of the square, and they help us humans identify it's a square. Features include properties like corners, edges, regions of interest points, ridges, etc. Naturally, features of an object that helps a machine to identify that object may be completely different as compared to the features that help humans to identify the same object.

The method S100 further comprises transforming S102 a plurality of image features comprised in the one or more encoded images to a Bird's Eye View (BEV) representation of the plurality of image features. In some embodiments, the plurality of image features are transformed to the BEV representation using an Inverse Perspective Mapping (IPM) algorithm and further based on a camera pose of each camera of the one or more cameras. In other words, the IPM algorithm ingests the image features (i.e., the encoded images) together with information about a camera pose of the associated cameras in order to output the BEV representation of the image features.

In more detail, the IPM algorithm requires information about the camera's pose, including its position and orientation in 3D space. This pose information is needed for mapping features from the camera's perspective to the Bird's Eye View (i.e., top-down view). The algorithm takes as input an image captured by the camera. This image contains various features, such as lane markings, road edges, or other scene elements, that need to be transformed to a BEV representation. To perform the transformation, IPM often employs a mathematical technique known as homography. A homography matrix is computed based on the camera pose information, which describes the relationship between points in the camera's perspective and points in the BEV perspective. Using the homography matrix, the IPM algorithm corrects the perspective distortion in the image. This distortion is caused by the camera's viewpoint, which can make objects appear distorted or skewed in the image.

In some embodiments, the method S100 further comprises encoding S106 a lidar output dataset 211 from one or more lidars of the vehicle onto the BEV representation using a machine-learning algorithm trained to extract a plurality of features of one or more road objects indicated in a lidar output dataset provided as input to the machine-learning algorithm. In other words, the method S100 may comprise adding lidar output data 211 to the BEV representation, thereby adding even more information to the BEV representation and enabling for improved accuracy in the resulting road geometry estimation.

Further, the method S100 comprises decoding S103 the BEV representation in order to extract a set of object embeddings from the BEV representation using one or more transformer-based machine-learning algorithms. Here, the one or more transformer-based machine-learning algorithms is/are trained to output the set of object embeddings based on an input comprising the BEV representation, a set of object queries 210, and a set of transformed prior object embeddings extracted at a preceding time step. In other words, the one or more transformer-based machine-learning algorithms are fed with the BEV representation, a set of object queries (i.e., one or more object queries) 210, and a set of transformed S105 prior object embeddings extracted at a previous time step.

In some embodiments, the transformer-based machine-learning model is configured to output one object embedding for each object query of the set of object queries. Moreover, the object embeddings and object queries may be vectors of the same size.

Moreover, in some embodiments, the method S100 comprises transforming S105 the object embeddings extracted at a previous time step using one or more Multi-Layer Perceptron, MLP, algorithms and motion data 214 of the vehicle. In other words, the extracted object embeddings are re-used (or "tracked") for the next iteration. A Multi-Layer Perceptron (MLP) is a type of artificial neural network used in machine learning. It is a feedforward neural network with one or more hidden layers, which makes it capable of modelling complex relationships in data. The term "perceptron" refers to a single-layer neural network, so the "multi-layer" aspect signifies that MLPs consist of multiple layers of interconnected neurons. In general, MLPs are trained through backpropagation where an optimization algorithm is used to calculate the gradient of the loss function (i.e., a function that measures difference between predicted output and ground truth) with respect to the network's weights and biases and updates them accordingly using optimization techniques like gradient descent.

Further, the method S100 comprises outputting S104 a position and class of each road object of the one or more road objects by decoding the extracted set of object embeddings. In other words, the method S100 comprises decoding S104 the extracted set of object embeddings in order to output a geometrical representation and class of each road object. Optionally, the output may further comprise geometrical uncertainties or uncertainty values of the geometrical representation of each road object. In some embodiments, the extracted set of object embeddings are decoded by using one or more Multi-Layer Perceptron, MLP, algorithms configured to output the position and class of each road object based on an input comprising object embeddings. In some embodiments, one set of MLPs (i.e., one or more MLPs) may be used to output the position of each road object and another set of MLPs (i.e., one or more MLPs) may be used to output the class of each road object.

In some embodiments, the method S100 further comprises forming S107 a geometric representation of the one or more road objects based on the output position and class of each road object. The geometric representation of the one or road more objects may for example be in the form of a set of polylines indicating the geometry of the one or more road objects in the surrounding environment of the vehicle. Moreover, the formed S107 geometric representation may be output to an ADS function configured to control steering, acceleration and/or braking of the vehicle, where the steering, acceleration and/or braking is controlled in view of the geometric representation.

Moreover, in some embodiments, the method S100 comprises forming S108 a loss function based on the output position and class of each road object and a ground-truth dataset. Further, the set of object queries may be updated S109 based on the formed loss function using a suitable optimization algorithm. In more detail, for the "position" output one can use a Euclidian distance loss to form the loss function, while for the "class" output one can use a cross-entropy loss (focal loss). The ground-truth dataset may for example be in the form of manually annotated HD map data.

Executable instructions for performing these functions are, optionally, included in a non-transitory computer-readable storage medium or other computer program product configured for execution by one or more processors.

Figure 2:
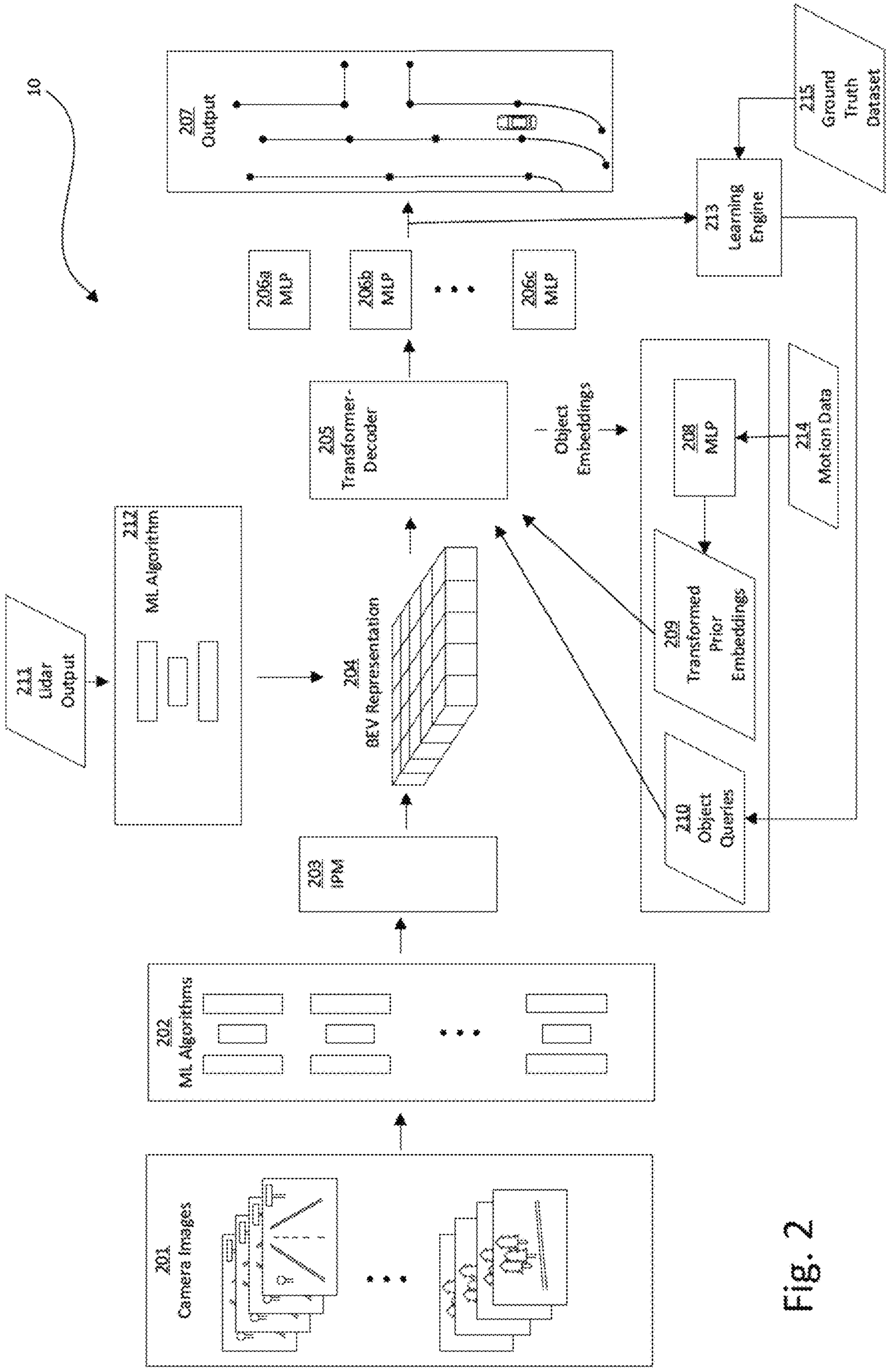
FIG. 2 is a schematic block diagram representation of a system for determining a representation of one or more road objects of a road for a vehicle traveling on the road in accordance with some embodiments.

FIG. 2 is a schematic block diagram representation of a system 10 for determining a representation of one or more road objects of a road for a vehicle traveling on the road, where the vehicle has one or more cameras. The system 10 comprises control circuitry (e.g., one or more processors) configured to perform the functions of the method S100 disclosed herein, where the functions may be included in a non-transitory computer-readable storage medium 12 or other computer program product configured for execution by the control circuitry 11. In other words, the system 10 comprises one or more memory storage areas 12 comprising program code, the one or more memory storage areas 12 and the program code configured to, with the one or more processors 11, cause the system 10 to perform the method S100 according to any one of the embodiments disclosed herein. However, in order to better elucidate the herein disclosed embodiments, the control circuitry is represented as various "modules" or blocks in FIG. 2, each of them linked to one or more specific functions of the control circuitry. As before, the executed process is a repetitive process, meaning that the system 10 repeats the steps with some set frequency or sample rate. In other words, the one or more memory storage areas and the program code are configured to, with the one or more processors, cause the system 10 to execute the process at each time step out of a plurality of consecutive time steps.

Accordingly, the one or more memory storage areas and the program code are configured to, with the one or more processors, cause the system 10 to encode one or more images 201 output from the one or more cameras of the vehicle using one or more machine-learning algorithms 202 trained to output image features of one or more road objects depicted in an image provided as input to the one or more machine-learning algorithms 201.

Further, the one or more memory storage areas and the program code are configured to, with the one or more processors, cause the system 10 to transform a plurality of image features comprised in the one or more encoded images to a Bird's Eye View (BEV) representation 204 of the plurality of image features. In some embodiments, the plurality of image features are transformed to the BEV representation 204 using an Inverse Perspective Mapping (IPM) algorithm 203 and based on a camera pose of each camera of the one or more cameras.

Further, in some embodiments, the one or more memory storage areas and the program code are configured to, with the one or more processors, cause the system 10 to encode a lidar output dataset 211 from one or more lidars of the vehicle onto the BEV representation using a machine-learning algorithm 212 trained to extract a plurality of features of one or more road objects indicated in a lidar output dataset 211 provided as input to the machine-learning algorithm.

The one or more memory storage areas and the program code are further configured to, with the one or more processors, cause the system 10 to decode the BEV representation in order to extract a set of object embeddings from the BEV representation using one or more transformer-based machine-learning algorithms 205. The one or more transformer-based machine-learning algorithms 205 are trained to output the set of object embeddings based on an input comprising the BEV representation 204, a set of object queries 210, and a set of transformed prior object embeddings 209 extracted at a preceding time step. In some embodiments, the transformer-based machine-learning model is configured to output one object embedding for each object query of the set of object queries. Moreover, the object embeddings and object queries may be vectors of the same size.

In the present context, a transformer-based machine-learning algorithm 205 used for decoding a Bird's Eye View (BEV) representation of a set of image features into a set of object embeddings may be understood as neural network architecture designed to understand and process spatial relationships and contextual information within the BEV representation. Here, the algorithm is specifically tailored for tasks like object detection and tracking within the road environment.

In more detail, the input to the transformer-based machine-learning algorithm the BEV representation of the image features, a set of object queries and the prior object embeddings. The image features encode information about road objects, such as e.g., their shapes, sizes, positions, and orientations. The transformer-based decoding stage takes these image features as input. It typically comprises multiple layers of transformer blocks. Each transformer block processes the image features using self-attention mechanisms to capture relationships between different parts of the BEV representation of the image features. As the algorithm processes the BEV representation of the image features through the transformer layers, it learns to generate object embeddings for each detected road object. These embeddings may be understood as numerical vectors that represent the characteristics and attributes of each object in a structured and, for a machine, meaningful way. Moreover, for tracking purposes, the transformer-based machine-learning algorithm can also consider temporal information, such as object movement history or trajectory. This is implemented by feeding the set of transformed prior object embeddings extracted at a preceding time step and helps in predicting the future positions and behaviours of the objects. The output of the algorithm is a set of object embeddings, one for each detected road object within the BEV view. These embeddings capture rich information about each object's characteristics and context within the scene. Depending on the specific application, post-processing steps may be applied to the object embeddings. This can include non-maximum suppression to remove duplicate detections or filtering based on confidence scores to ensure the highest-quality object representations.

Further, in some embodiments, the one or more memory storage areas and the program code are configured to, with the one or more processors, cause the system 10 to transform the object embeddings extracted at a previous time step using one or more Multi-Layer Perceptron, MLP, algorithms 208 and motion data 214 of the vehicle.

Further, the one or more memory storage areas and the program code are configured to, with the one or more processors, cause the system 10 to output a position and class of each road object of the one or more road objects by decoding the extracted set of object embeddings. Moreover, in some embodiments, the extracted set of object embeddings are decoded by using one or more Multi-Layer Perceptron, MLP, algorithms 206*a*-206*c* configured to output the position and class of each road object based on an input comprising object embeddings.

Moreover, in some embodiments, the one or more memory storage areas and the program code are configured to, with the one or more processors, cause the system 10 to form/output a geometric representation 207 of the one or more road objects based on the position and class of each road object. Thus, instead of outputting the position and class of each road object, the system 10 may simply output a geometric representation 207 based on the position and class of each road object as indicated by the decoded object embeddings. As mentioned, the geometric representation

207 may be consumed by various ADS functions relying on road model representations as input, such as, e.g., any autopilot function.

Further, the one or more memory storage areas and the program code may be configured to, with the one or more processors, cause the system 10 to form a loss function based on the output position and class of each road object and a ground-truth dataset 215. This is indicated in the illustration by the Learning Engine 213. Moreover, the one or more memory storage areas and the program code may be configured to, with the one or more processors, cause the system to update the set of object queries based on the formed loss function.

Figure 3:
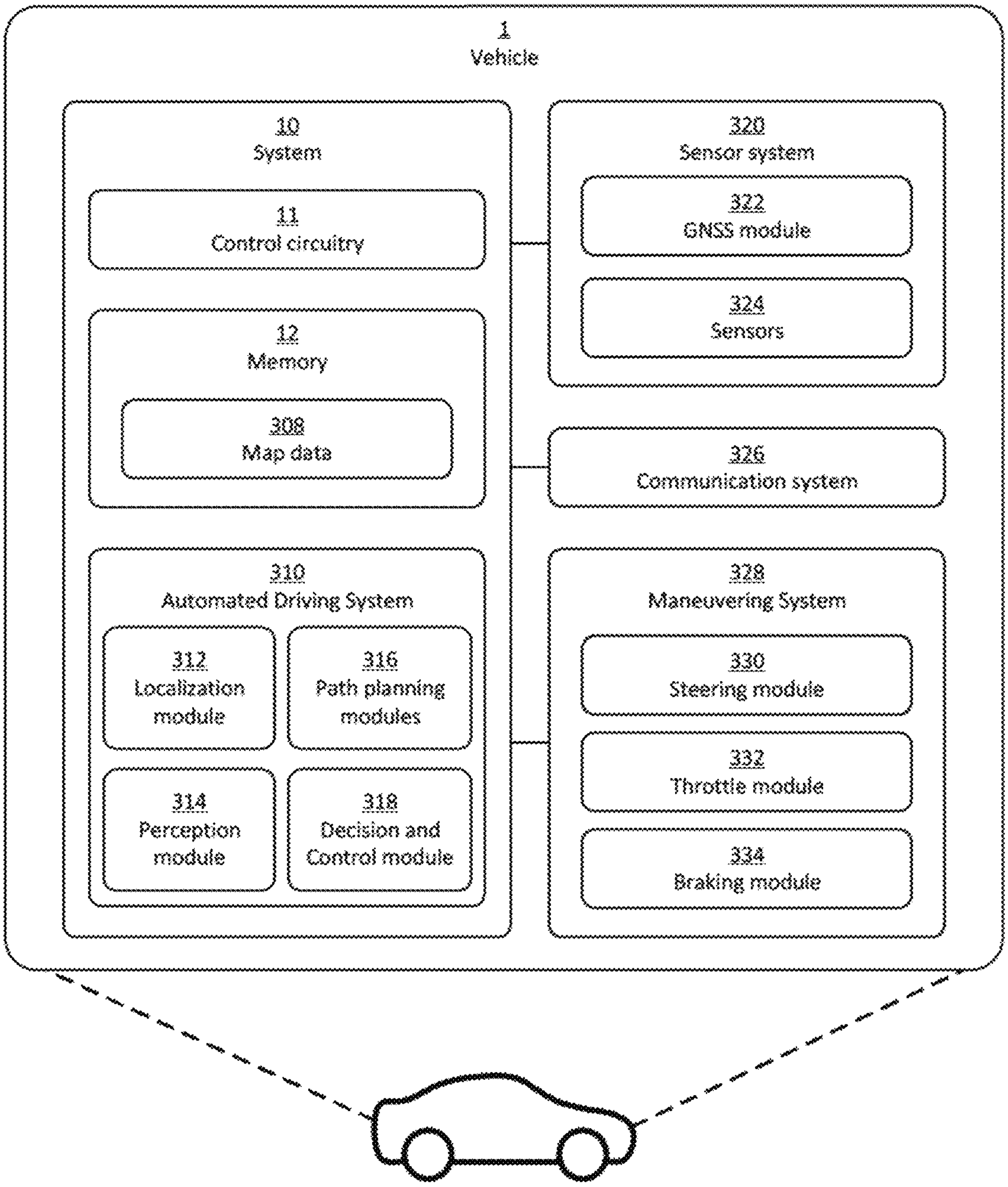
FIG. 3 is a schematic illustration of a vehicle comprising a system for determining a representation of one or more road objects of a road for a vehicle traveling on the road in accordance with some embodiments.

FIG. 3 is a schematic illustration of an ADS-equipped vehicle 1 comprising such a system 10. As used herein, a "vehicle" is any form of motorized transport. For example, the vehicle 1 may be any road vehicle such as a car (as illustrated herein), a motorcycle, a (cargo) truck, a bus, etc.

The system 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g., the ADS 310). Moreover, the system 10 may form a part of the ADS 310, i.e., the system 10 may be implemented as a module or feature of the ADS. The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

In the illustrated example, the memory 12 further stores map data 308. The map data 308 may for instance be used by the ADS 310 of the vehicle 1 in order to perform autonomous functions of the vehicle 1. The map data 308 may comprise high-definition (HD) map data. It is contemplated that the memory 12, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 11 may be distributed e.g., such that one or more processors of the control circuitry 11 is provided as integral elements of the ADS 310 (e.g., of the perception module 314 of the ADS) or any other system of the vehicle 1. In other words, according to an exemplary embodiment, any distributed or local control circuitry device may be utilized in the realization of the present inventive concept. The ADS 310 is configured to carried out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 can have any combination of the various elements shown in FIG. 3. Moreover, the vehicle 1 may comprise further elements than those shown in FIG. 3. While the various elements are herein shown as located inside the vehicle 1, one or more of the elements can be located externally to the vehicle 1. For example, the map data may be stored in a remote server and accessed by the various components of the vehicle 1 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 3 should be seen merely as an illustrative example, as the elements of the vehicle I can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 1. The sensor system 320 may further comprise one or more sensors 324. The sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 1.

The vehicle 1 further comprises a communication system 326. The communication system 326 is configured to communicate with external units, such as other vehicles (i.e., via vehicle-to-vehicle (V2V) communication protocols), remote servers (e.g., cloud servers), databases or other external devices, i.e., vehicle-to-infrastructure (V2I) or vehicle-to-everything (V2X) communication protocols. The communication system 318 may communicate using one or more communication technologies. The communication system 318 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g., IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g., remote operator or control center) and/or to receive input from a remote location by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 1 further comprises a maneuvering system 320. The maneuvering system 328 is configured to control the maneuvering of the vehicle 1. The maneuvering system 328 comprises a steering module 330 configured to control the heading of the vehicle 1. The maneuvering system 328 further comprises a throttle module 332 configured to control actuation of the throttle of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e., from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g., comprised in one or more electronic control modules and/or nodes of the vehicle 1, adapted and/or configured to interpret sensory data—relevant for driving of the vehicle 1—to identify, e.g., obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data e.g., from the sensor system 320. In some embodiments, the system 10 may be implemented as a sub-module of the perception module 314.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

The herein disclosed technology has been presented above with reference to specific embodiments. However, other embodiments than the above described are possible and within the scope of the invention. Different method steps than those described above, performing the method by hardware or software, may be provided within the scope of the herein disclosed technology. Thus, according to some embodiments, there is provided a non-transitory computer-readable storage medium storing one or more programs configured to be executed by one or more processors of a computing device of a vehicle, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

Accordingly, it should be understood that parts of the described solution may be implemented either in the vehicle 1, in a system located external the vehicle 1, or in a combination of internal and external the vehicle; for instance in a server in communication with the vehicle, a so called cloud solution. For instance, sensor data may be sent to an external system and that system performs the encoding, transforming and decoding steps. The different features and steps of the embodiments may be combined in other combinations than those described.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various encoding steps, transforming steps, decoding steps and outputting steps. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A computer-implemented method for determining a representation of one or more road objects of a road for a vehicle traveling on the road, the vehicle having one or more cameras, the method comprising:

for each time step out of a plurality of consecutive time steps:

encoding one or more images output from the one or more cameras using one or more machine-learning algorithms trained to output image features of one or more road objects depicted in an image provided as input to the one or more machine-learning algorithms;

transforming a plurality of image features comprised in the one or more encoded images to a Bird's Eye View (BEV) representation of the plurality of image features;

decoding the BEV representation in order to extract a set of object embeddings from the BEV representation using one or more transformer-based machine-learning algorithms trained to output the set of object embeddings based on an input comprising the BEV representation, a set of object queries, and a set of transformed prior object embeddings extracted at a preceding time step;

outputting a position and class of each road object of the one or more road objects by decoding the extracted set of object embeddings.

2. The method according to claim 1, further comprising: for each time step out of the plurality of consecutive time steps:

transforming the object embeddings extracted at a previous time step using one or more Multi-Layer Perceptron (MLP) algorithms and motion data of the vehicle.

3. The method according to claim 1, further comprising: for each time step out of the plurality of consecutive time steps, encoding a lidar output dataset from one or more lidars of the vehicle onto the BEV representation using a machine-learning algorithm trained to extract a plurality of features of one or more road objects indicated in a lidar output dataset provided as input to the machine-learning algorithm.

4. The method according to claim 1, wherein the plurality of image features are transformed to the BEV representation using an Inverse Perspective Mapping algorithm and based on a camera pose of each camera of the one or more cameras.

5. The method according to claim 1, wherein the transformer-based machine-learning model is configured to output one object embedding for each object query of the set of object queries, and wherein the object embeddings and object queries are vectors of the same size.

6. The method according to claim 1, further comprising: for each time step out of the plurality of consecutive time steps forming a geometric representation of the one or more road objects based on the output position and class of each road object.

7. The method according to claim 1, wherein the extracted set of object embeddings are decoded by using one or more Multi-Layer Perceptron (MLP) algorithms configured to output the position and class of each road object based on an input comprising object embeddings.

8. The method according to claim 1, further comprising: forming a loss function based on the output position and class of each road object and a ground-truth dataset.

9. The method according to claim 8, further comprising: updating the set of object queries based on the formed loss function.

10. A computer program product comprising instructions which, when executed by a computing device of a vehicle, causes the computing device to carry out the method according to claim 1.

11. A non-transitory computer-readable storage medium storing instructions which, when executed by a computing device of a vehicle, causes the computing device to carry out the method according to claim 1.

12. A system for determining a representation of one or more road objects of a road for a vehicle traveling on the road, the vehicle having one or more cameras, the system comprising one or more memory storage areas comprising program code, the one or more memory storage areas and the program code being configured to, with the one or more processors, cause the system to at least:

for each time step out of a plurality of consecutive time steps:

encode one or more images output from the one or more cameras using one or more machine-learning algorithms trained to output image features of one or more road objects depicted in an image provided as input to the one or more machine-learning algorithms;

transform a plurality of image features comprised in the one or more encoded images to a Bird's Eye View (BEV) representation of the plurality of image features;

decode the BEV representation in order to extract a set of object embeddings from the BEV representation using one or more transformer-based machine-learning algorithms trained to output the set of object embeddings based on an input comprising the BEV representation, a set of object queries, and a set of transformed prior object embeddings extracted at a preceding time step;

output a position and class of each road object of the one or more road objects by decoding the extracted set of object embeddings.

13. A vehicle comprising a system according to claim 12.

* * * * *